United States Patent
Tsutsui et al.

(10) Patent No.: US 9,766,844 B2
(45) Date of Patent: Sep. 19, 2017

(54) DISPLAY PROCESSING APPARATUS AND DISPLAY PROCESSING METHOD

(71) Applicants: Risa Tsutsui, Tokyo (JP); Ryonosuke Miyazaki, Tokyo (JP); Hiroyuki Yoshida, Tokyo (JP); Yuki Kawata, Tokyo (JP); Rieko Ishihara, Tokyo (JP)

(72) Inventors: Risa Tsutsui, Tokyo (JP); Ryonosuke Miyazaki, Tokyo (JP); Hiroyuki Yoshida, Tokyo (JP); Yuki Kawata, Tokyo (JP); Rieko Ishihara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 233 days.

(21) Appl. No.: 14/534,558

(22) Filed: Nov. 6, 2014

(65) Prior Publication Data

US 2015/0138570 A1    May 21, 2015

(30) Foreign Application Priority Data

Nov. 18, 2013   (JP) ................................. 2013-238333

(51) Int. Cl.
*G06F 17/00*    (2006.01)
*G06F 3/12*    (2006.01)

(52) U.S. Cl.
CPC .......... *G06F 3/1256* (2013.01); *G06F 3/1208* (2013.01)

(58) Field of Classification Search
CPC ..... G06F 17/212; G06F 3/1208; G06F 3/1256
USPC ................................. 715/273, 274
See application file for complete search history.

(56) References Cited

U.S. PATENT DOCUMENTS

| | | | | |
|---|---|---|---|---|
| 5,947,619 A * | 9/1999 | Kurashina | ................ | B41J 3/407 400/61 |
| 6,351,265 B1 * | 2/2002 | Bulman | ................... | G06T 11/60 345/660 |
| 6,381,027 B1 * | 4/2002 | Tanaka | .................. | B41J 3/4075 358/1.1 |
| 7,760,405 B2 * | 7/2010 | Ricard | .................. | G06F 17/212 358/1.12 |
| 8,305,646 B2 * | 11/2012 | Nakajima | ............. | G06F 3/1208 358/3.28 |
| 8,418,059 B2 * | 4/2013 | Kitada | ................ | G06F 3/04847 715/255 |
| 8,891,098 B2 * | 11/2014 | Segawa | ................ | G06F 3/1298 358/1.1 |

(Continued)

FOREIGN PATENT DOCUMENTS

JP   2012-161080   8/2012
JP   2013-219694   10/2013

(Continued)

*Primary Examiner* — Cong-Lac Huynh
(74) *Attorney, Agent, or Firm* — Oblon, McClelland, Maier & Neustadt, L.L.P.

(57) ABSTRACT

A display processing apparatus includes a first display controller that displays a background image in a display unit; and a second display controller that displays a print image in the display unit. The second display controller changes a magnification of the print image so that the print image has a size obtained by changing a size of a recording medium on which the print image is to be printed on a scale of the background image displayed in the display unit, and superimposes and displays the print image on the background image.

16 Claims, 6 Drawing Sheets

(56) References Cited

U.S. PATENT DOCUMENTS

| | | | |
|---|---|---|---|
| 8,934,157 B2* | 1/2015 | Kudo | G06F 3/1205 |
| | | | 358/1.15 |
| 8,984,428 B2* | 3/2015 | Matas | G06T 11/60 |
| | | | 715/765 |
| 9,179,036 B2* | 11/2015 | Horiuchi | H04N 1/00408 |
| 9,569,151 B2* | 2/2017 | Sakurai | G06F 3/1208 |
| 9,594,529 B2* | 3/2017 | Hong | G06F 3/1204 |
| 2004/0001227 A1* | 1/2004 | Bourdev | G06K 15/02 |
| | | | 358/2.1 |
| 2007/0115300 A1* | 5/2007 | Barney | G06T 11/60 |
| | | | 345/619 |
| 2007/0171464 A1* | 7/2007 | Nakajima | G06F 3/1208 |
| | | | 358/1.15 |
| 2009/0193335 A1* | 7/2009 | Tanaka | G06F 17/211 |
| | | | 715/273 |
| 2010/0202010 A1* | 8/2010 | Xiao | G06F 17/30905 |
| | | | 358/1.15 |
| 2012/0050801 A1* | 3/2012 | Itami | G06F 3/1208 |
| | | | 358/1.15 |
| 2012/0159321 A1* | 6/2012 | Rolleston | G06T 15/005 |
| | | | 715/274 |
| 2013/0021629 A1* | 1/2013 | Kurilin | H04N 1/3878 |
| | | | 358/1.9 |
| 2013/0050732 A1* | 2/2013 | Ikeda | H04N 1/00411 |
| | | | 358/1.13 |
| 2013/0271791 A1 | 10/2013 | Miyazaki et al. | |
| 2013/0328964 A1* | 12/2013 | Yeh | G02B 27/2214 |
| | | | 347/20 |
| 2014/0035950 A1* | 2/2014 | Jonsson | G06T 11/60 |
| | | | 345/629 |
| 2014/0125659 A1* | 5/2014 | Yoshida | G06T 15/506 |
| | | | 345/419 |
| 2014/0368669 A1* | 12/2014 | Talvala | G06T 7/194 |
| | | | 348/207.1 |
| 2016/0104288 A1* | 4/2016 | Wexler | G01C 11/04 |
| | | | 348/135 |
| 2016/0125252 A1* | 5/2016 | Harada | G06K 9/50 |
| | | | 382/103 |
| 2016/0185043 A1* | 6/2016 | Klappert | B29C 67/0088 |
| | | | 264/40.1 |
| 2016/0188682 A1* | 6/2016 | Silverstein | G06Q 10/105 |
| | | | 707/803 |

FOREIGN PATENT DOCUMENTS

| | | |
|---|---|---|
| JP | 2014-095965 | 5/2014 |
| JP | 2014-096648 | 5/2014 |
| JP | 2014-182410 | 9/2014 |

* cited by examiner

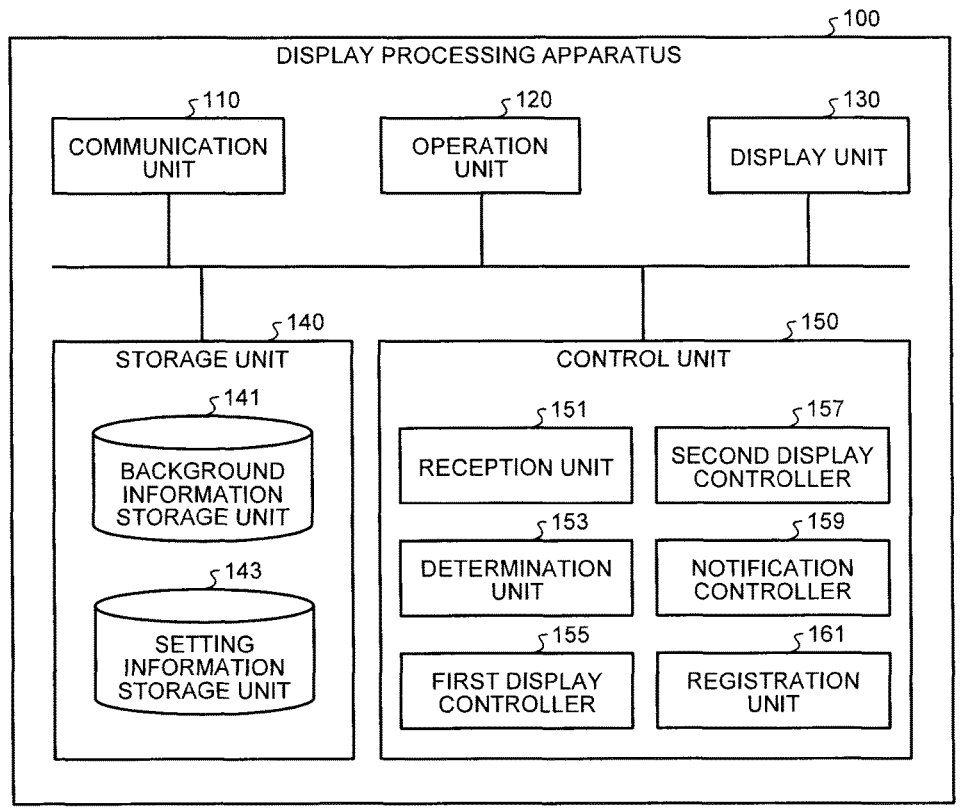

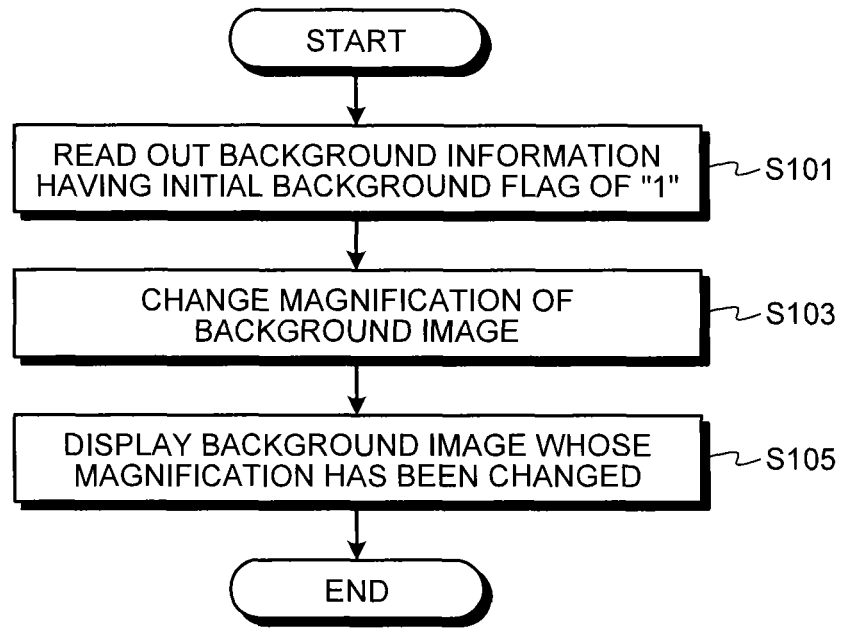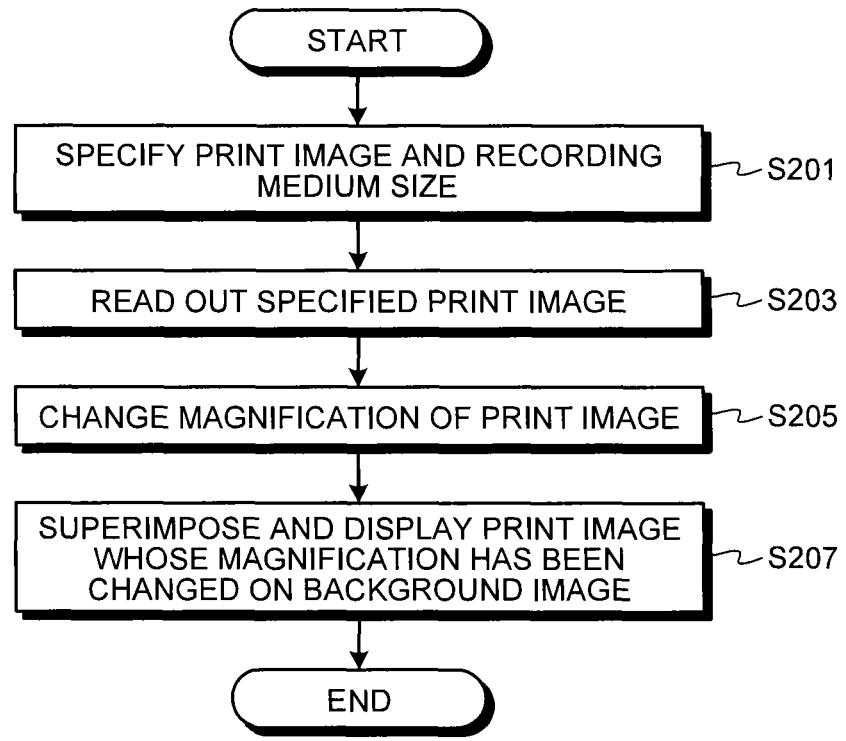

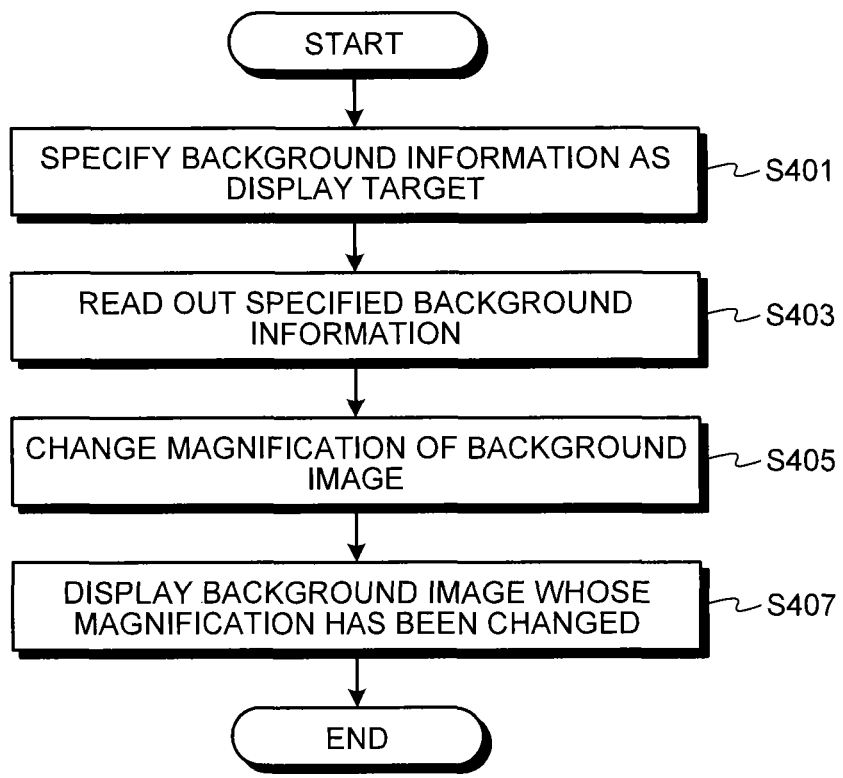
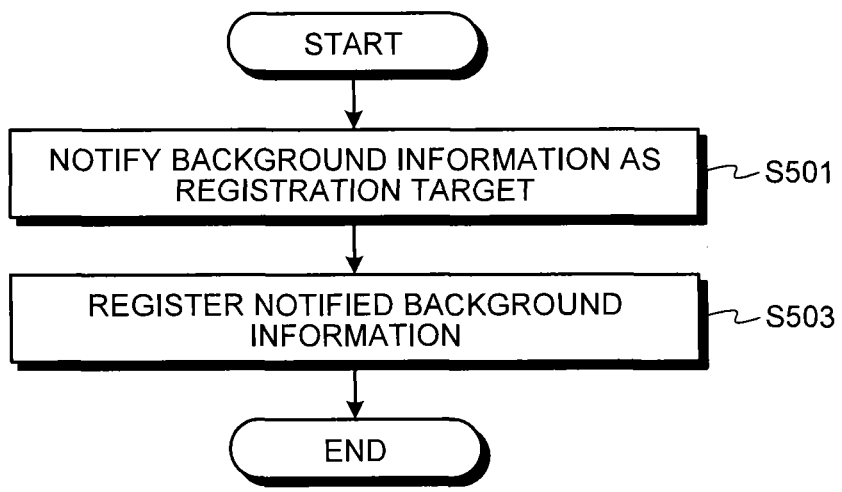

DISPLAY PROCESSING APPARATUS AND DISPLAY PROCESSING METHOD

CROSS-REFERENCE TO RELATED APPLICATION

The present application claims priority to and incorporates by reference the entire contents of Japanese Patent Application No. 2013-238333 filed in Japan on Nov. 18, 2013.

BACKGROUND OF THE INVENTION

1. Field of the Invention

The present invention relates to a display processing apparatus and a display processing method.

2. Description of the Related Art

A technique of displaying a preview before printing a print material has been known. For example, Japanese Patent Application Laid-Open No. 2012-161080 discloses a technique of providing a high-quality preview image by taking kinds of recording media and reflection of an optical source into consideration.

However, it is impossible in the above-described conventional technique to allow a user to check a size of a print material while allowing the user to check a print content before printing.

Therefore, there is a need for a display processing apparatus and a display processing method which enable a user to check a size of a print material before printing.

SUMMARY OF THE INVENTION

It is an object of the present invention to at least partially solve the problems in the conventional technology.

According to an embodiment, there is provided a display processing apparatus that includes a first display controller that displays a background image in a display unit; and a second display controller that displays a print image in the display unit. The second display controller changes a magnification of the print image so that the print image has a size obtained by changing a size of a recording medium on which the print image is to be printed on a scale of the background image displayed in the display unit, and superimposes and displays the print image on the background image.

According to another embodiment, there is provided a display processing apparatus that includes a first display controller that displays a background image in a display unit; and a second display controller that displays a print image in the display unit. The first display controller changes a magnification of the background image on a scale of the print image displayed in the display unit with respect to a size of a recording medium on which the print image is to be printed, and superimposes and displays the background image under the print image.

According to still another embodiment, there is provided a display processing method that includes: displaying a background image in a display unit; and displaying a print image in the display unit. A magnification of the print image is changed so that the print image has a size obtained by changing a size of a recording medium on which the print image is to be printed on a scale of the background image displayed in the display unit, and the print image is superimposed and displayed on the background image at the displaying of the print image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of an example of a configuration of a display processing apparatus according to an embodiment;

FIG. 2 illustrates an example of background information according to the embodiment;

FIG. 4 is a flowchart of an example of an initial display processing for a background image to be executed in the display processing apparatus according to the embodiment;

FIG. 5 is a flowchart of an example of a display processing for a print image to be executed in the display processing apparatus according to the embodiment;

FIG. 7 is a flowchart of an example of a display change processing for a background image to be executed in the display processing apparatus according to the embodiment;

FIG. 8 is a flowchart of an example of a registration processing for background information to be executed in the display processing apparatus according to the embodiment.

DETAILED DESCRIPTION OF THE PREFERRED EMBODIMENTS

Figure 3:
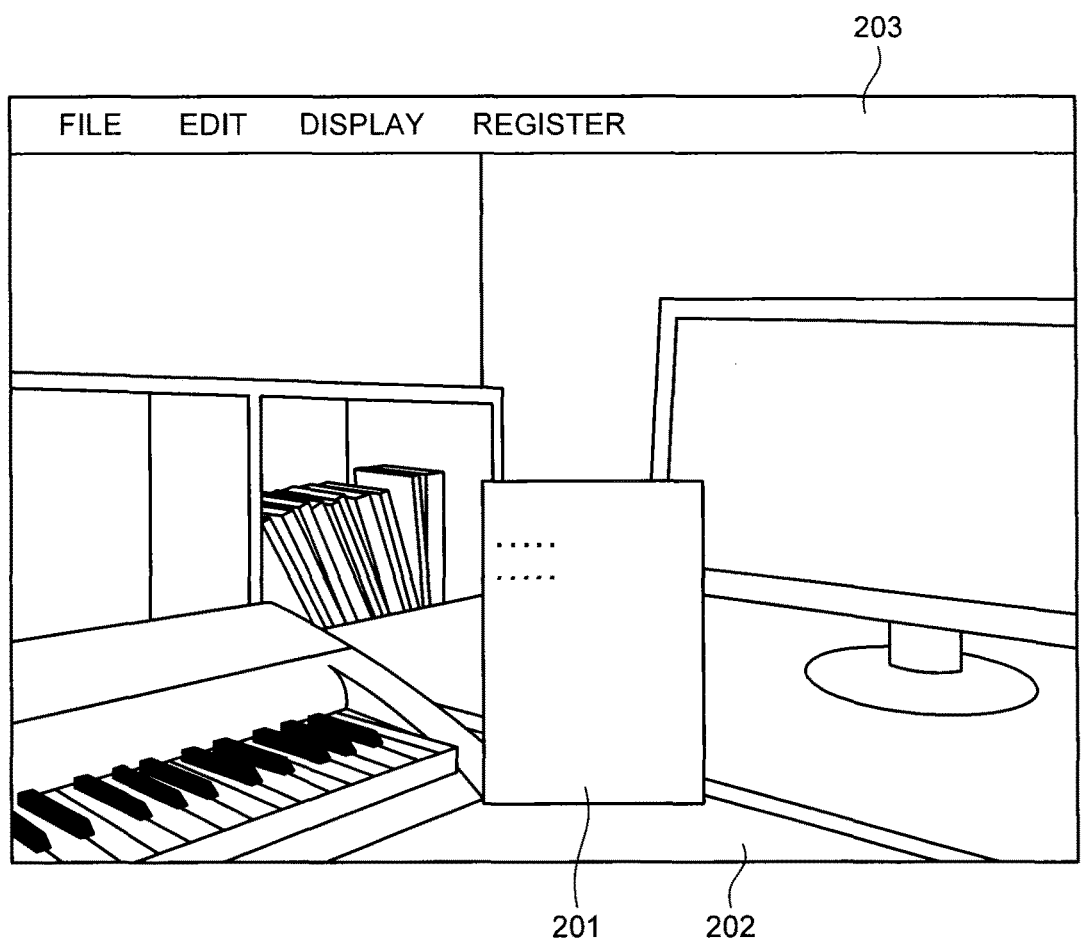
FIG. 3 illustrates an example of a preview according to the embodiment.

An exemplary embodiment of a display processing apparatus and a display processing method according to the present invention will be explained in detail below with reference to the accompanying drawings.

A display processing apparatus according to an embodiment displays a preview before causing a printing device (not-illustrated) to perform printing and may be a personal computer (PC), a tablet terminal, and a smartphone, for example. However, the present invention is not limited thereto and the display processing apparatus may be a printing device provided with a display panel.

FIG. 1 is a block diagram of an example of a configuration of a display processing apparatus 100 according to the embodiment. As illustrated in FIG. 1, the display processing apparatus 100 is provided with a communication unit 110, an operation unit 120, a display unit 130, a storage unit 140, and a control unit 150.

The communication unit 110, which communicates with an external device such as the printing device via a network (not-illustrated), can be realized by communication devices such as a network interface card (NIC).

The operation unit 120 is used for inputs of various operations, and includes an input device such as a keyboard, a mouse, a touch pad, and a touch screen.

The display unit 130 displays screens of various kinds, and includes a display device such as a liquid crystal display and a touch screen display.

The storage unit 140 stores various kinds of programs to be executed in the display processing apparatus 100 and data to be used in various kinds of processings to be performed in the display processing apparatus 100. The storage unit 140 stores a document file and an image file as a print target, for example.

The storage unit 140 includes at least one of storage devices capable of magnetic, optical, or electric storage such as a hard disk drive (HDD), a solid state drive (SSD), a memory card, an optical disk, a read only memory (ROM), and a random access memory (RAM).

The storage unit 140 includes a background information storage unit 141 and a setting information storage unit 143.

The background information storage unit 141 stores background information. The background information includes a background image and an actual dimension of a background shown by the background image. FIG. 2 illustrates an example of background information according to the embodiment. In the example illustrated in FIG. 2, the background information includes a background image name, a background image, actual dimensions (vertical and horizontal dimensions), and an initial background flag.

The background image name indicates a name of a background image. The background image is an image file for the background image. The actual dimensions (vertical and horizontal dimensions) show dimensions of the background shown by the background image in the real world. The initial background flag shows whether or not the background information is used as an initial background in preview. The initial background flag set to "1" indicates that the corresponding background information is used as the initial background.

The setting information storage unit 143 stores setting information that indicates either a first setting by which a size of a recording medium on which a print image is to be printed is changed with reference to a background image displayed in the display unit 130 or a second setting by which the size of the recording medium is changed with reference to a print image displayed in the display unit 130.

The print image is image data for printing, stored in the storage unit 140, such as a document file and an image file as a print target and image data for preview after conversion to a data format (RGB, for example) supported in the display unit 130 is assumed in the embodiment. The document file and the image file as a print target may be a file of Portable Document Format (PDF) or Tagged Image File Format (TIFF) used in creating a print image. A processing of converting the document file and the image file as a print target to a print image is performed by the control unit 150 which will be explained later. For the recording medium, recording paper is taken as an example.

The control unit 150 controls components of the display processing apparatus 100, and includes a control device such as a central processing unit (CPU). The control unit 150 is provided with a reception unit 151, a determination unit 153, a first display controller 155, a second display controller 157, a notification controller 159, and a registration unit 161.

The control unit 150 runs (executes) a program stored in the storage unit 140 to realize the reception unit 151, the determination unit 153, the first display controller 155, the second display controller 157, the notification controller 159, and the registration unit 161 as software.

The reception unit 151 receives a designation of a document file or an image file as a print target (preview target), a designation of a background image as a preview target, a request (designation) for changing a size of a recording medium on which a print image is to be printed, and the like from the operation unit 120.

The first display controller 155 displays a background image in the display unit 130. Specifically, the first display controller 155 reads out background information from the background information storage unit 141 and displays a background image included in the read background information. On this occasion, the first display controller 155 displays the background image in a displayable size in the display unit 130.

The first display controller 155 reads out background information in which the initial background flag is set to "1" in initial display and reads out, when a designation of a background image as a preview target is received by the reception unit 151, background information including the designated (specified) background image.

The second display controller 157 displays a print image in the display unit 130. Specifically, when a designation of a document file or an image file as a print target (preview target) is received by the reception unit 151, the second display controller 157 reads out from the storage unit 140, converts to a print image, and displays in the display unit 130 the designated (specified) document file or image file.

The second display controller 157, which is provided with a known three dimensional display engine as typified by OpenGL, is also able to display the print image in three dimensions at a display position on the display unit 130. The display position may be preset or specified by a user through the operation unit 120. In the three dimensional display engine, it is possible to reflect a light reflection, obtained by using, as arguments, parameters indicating an intensity of an optical source and parameters indicating a reflection intensity of the optical source and adding a directional relation with the optical source, onto the print image and to display it in the display unit 130.

In the embodiment, when a background image is displayed in the display unit 130, the second display controller 157 changes a magnification of the print image into a size of a recording medium on which the print image is to be printed, the size of the recording medium being changed by a scale of the background image displayed in the display unit 130, and superimposes and displays the print image on the background image. The scale of the background image corresponds to the scale of the background image displayed in the display unit 130 with respect to the actual dimensions of the background shown by the background image. In other words, the scale of the background image is equal to the scale of a display size of the background image with respect to the actual dimensions included in the background information.

Specifically, the second display controller 157 changes a magnification of the print image so that the size of the print image becomes equal to "size of recording medium×display resolution of display unit 130×magnification of background image" and superimposes and displays the print image on the background image.

For example, assumed is a case where the size of the recording medium is "A4 (vertical size: 297 mm, horizontal size: 210 mm)", the display resolution of the display unit 130 is "96 dots per inch (dpi)", the actual dimensions of the background image is "vertical size: 100 cm, horizontal size: 150 cm", the displayable size in the display unit 130 is "vertical size: 30 cm (1134 dots), horizontal size: 30 cm (1134 dots)", and the display magnification of the display unit 130 is "100%".

In this case, the magnification of the background image becomes "Min {(30 cm÷100 cm), (30 cm÷150 cm)}=0.2". Here, "Min" is a function which provides a minimum value in the values inside the curly brackets "{ }". Hence, a vertical size of the print image becomes "(297 mm÷25.4 mm)×96 dpi×0.2=225 dots" and a horizontal size of the print image becomes "210 mm÷25.4 mm)×96 dpi×0.2=159 dots", and the second display controller 157 changes a magnification of the print image to make the vertical size 225 dots and the horizontal size 159 dots and superimposes and displays the print image on the background image. Here, "25.4 mm" is equal to one inch.

FIG. 3 illustrates an example of a preview according to the embodiment. In the example illustrated in FIG. 3, superimposed and displayed on a background image 202 is a print image 201 whose magnification is changed so that the size thereof becomes "size of recording medium×display resolution of display unit 130×magnification of background image".

Besides, four menus "FILE", "EDIT", "DISPLAY", and "REGISTER" are displayed in a menu bar 203 in the example illustrated in FIG. 3.

The menu "FILE" allows a user to specify a document file or an image file as a print target (preview target) and specify a background image as a preview target by using the operation unit 120.

The menu "EDIT" allows a user to specify the size of the recording medium and specify the display size of the background image by using the operation unit 120.

The menu "DISPLAY" allows a user to specify the display magnification of the display unit 130 by using the operation unit 120.

The menu "REGISTER" allows a user to register new background information in the background information storage unit 141 by using the operation unit 120.

In the embodiment, when a print image is displayed in the display unit 130 in changing the background image on which the print image is superimposed, the first display controller 155 changes a magnification of the background image by the scale of the print image displayed in the display unit 130 with respect to the size of the recording medium on which the print image is to be printed, and superimposes and displays the background image under the print image.

In the embodiment, when a request (designation) for changing the size of the recording medium is received by the reception unit 151, the second display controller 157 changes a magnification of the print image by a magnification for the size of the recording medium based on the change request, or the first display controller 155 changes a magnification of the background image by an inverse number of the magnification for the size of the recording medium based on the change request. In a case where the current size of the recording medium is "A4" and the change request is to make a change to A5, the magnification for the size of the recording medium based on the change request is a magnification for a change from A4 to A5.

Specifically, when the request (designation) for changing the size of the recording medium is received by the reception unit 151 and the setting information stored in the setting information storage unit 143 indicates the second setting, the first display controller 155 changes a magnification of the background image by the inverse number of the magnification for the size of the recording medium based on the change request.

On the other hand, when the request (designation) for changing the size of the recording medium is received by the reception unit 151 and the setting information stored in the setting information storage unit 143 indicates the first setting, the second display controller 157 changes a magnification of the print image by the magnification for the size of the recording medium based on the change request.

Here, when the request (designation) for changing the size of the recording medium is received by the reception unit 151, the determination unit 153 checks whether the setting is the first setting or the second setting based on the setting information stored in the setting information storage unit 143. When the setting information indicates the first setting, the determination unit 153 determines whether or not the size of the print image after changing the magnification is still smaller than the background image displayed in the display unit 130 even after the change of the magnification of the print image by the magnification for the size of the recording medium based on the change request (designation) received by the reception unit 151.

When a result of the determination by the determination unit 153 shows that the print image is still smaller, the second display controller 157 changes a magnification of the print image by the magnification for the size of the recording medium based on the change request and when the result of the determination by the determination unit 153 shows that the print image is not still smaller, the first display controller 155 changes a magnification of the print image by the inverse number of the magnification for the size of the recording medium based on the change request.

When the result of the determination by the determination unit 153 shows that the print image is not still smaller, the notification controller 159 may notify the display unit 130 of the result of the determination. In this case, the reception unit 151 further receives instruction information on whether or not to change the size of the recording medium with reference to the print image from the operation unit 120. When the print image is not still smaller and the instruction information indicates an instruction to change the size of the recording medium with reference to the print image, the first display controller 155 may change a magnification of the background image by the inverse number of the magnification, and when the print image is not still smaller and the instruction information indicates no instruction to change the size of the recording medium with reference to the print image, the second display controller 157 may change a magnification of the print image by the magnification.

When the reception unit 151 receives an instruction to display the print image in a real size of the recording medium from the operation unit 120, the second display controller 157 may change a magnification of the print image into the size of the recording medium and superimpose and display the print image on the background image, and the first display controller 155 may change a magnification of the background image into the actual dimensions of the background shown by the background image and superimpose and display the background image under the print image.

For example, assumed is a case where the size of the recording medium is "A4 (vertical size: 297 mm, horizontal size: 210 mm)", the display resolution of the display unit 130 is "96 dpi", and the display magnification of the display unit 130 is "100%".

In this case, a vertical size of the print image becomes "(297 mm÷25.4 mm)×96 dpi×1.0=1123 dots" and a horizontal size of the print image becomes "210 mm÷25.4 mm)×96 dpi×1.0=794 dots", and the second display controller 157 changes a magnification of the print image to make the vertical size 1123 dots and the horizontal size 794 dots and superimposes and displays the print image on the background image.

When the reception unit 151 receives a request (designation) for registering new background information from the operation unit 120, the registration unit 161 registers the specified background information in the background information storage unit 141.

FIG. 4 is a flowchart of an example of an initial display processing for a background image to be executed in the display processing apparatus 100 according to the embodiment.

First, the first display controller 155 reads out, from the background information storage unit 141, background information whose initial background flag is set to "1" (step S101).

The first display controller 155 then changes a magnification of a background image included in the read background information into a displayable size in the display unit 130 (step 5103) and displays the background image whose magnification is changed in the display unit 130 (step S105).

FIG. 5 is a flowchart of an example of a display processing for a print image to be executed in the display processing apparatus 100 according to the embodiment.

First, the reception unit 151 receives a designation of a document file or an image file as a print target (preview target) and the size of the recording medium on which the print image is to be printed from the operation unit 120 (step S201).

When the designation of the document file or the image file as a print target (preview target) is received by the reception unit 151, the second display controller 157 then reads out the document file or the image file from the storage unit 140 to make a conversion to a print image (step S203).

The second display controller 157 then changes a magnification of the print image so that the size of a converted print image becomes "size of recording medium×display resolution of display unit 130×magnification of background image" (step S205) and superimposes and displays the print image on the background image (step S207).

Figure 6:
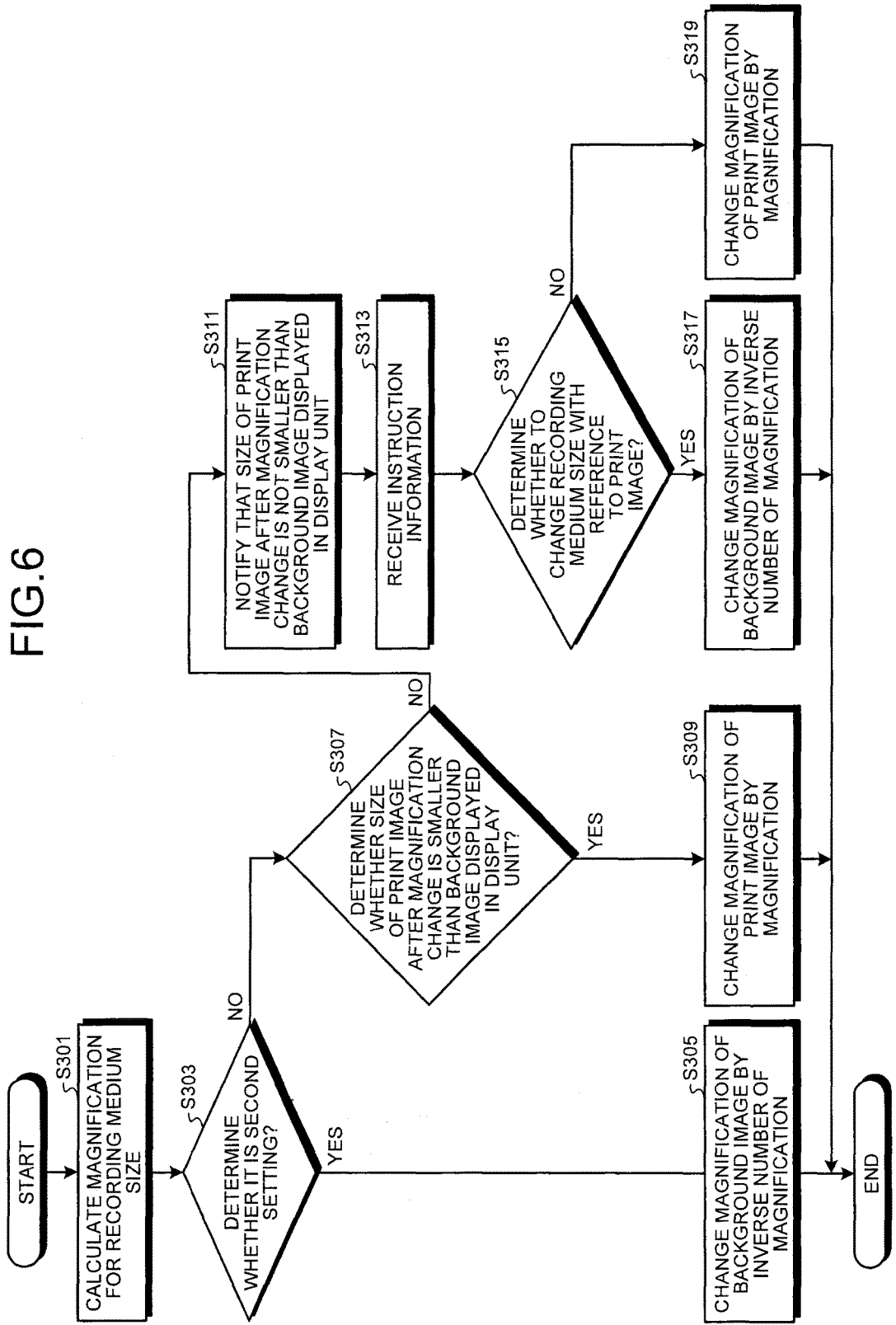
FIG. 6 is a flowchart of an example of a change processing for a size of a recording medium to be executed in the display processing apparatus according to the embodiment.

FIG. 6 is a flowchart of an example of a change processing for the size of the recording medium to be executed in the display processing apparatus 100 according to the embodiment.

When receiving the request (designation) for changing the size of the recording medium on which the print image is to be printed from the operation unit 120, the reception unit 151 first calculates a magnification for the size of the recording medium based on the change request (step S301).

The reception unit 151 then checks whether or not the setting information stored in the setting information storage unit 143 indicates the second setting (step S303).

When the setting information indicates the second setting ("Yes" at step S303), the first display controller 155 changes a magnification of the background image displayed in the display unit 130 by the inverse number of the magnification for the size of the recording medium based on the change request (step S305).

On the other hand, when the setting information indicates the first setting ("No" at step S303), the determination unit 153 determines whether or not the size of the print image after changing the magnification is still smaller than the background image displayed in the display unit 130 even by the change of the magnification of the print image by the magnification for the size of the recording medium based on the change request (designation) (step S307).

When the result of the determination by the determination unit 153 shows that the print image is still smaller ("Yes" step S307), the second display controller 157 changes a magnification of the print image displayed in the display unit 130 by the magnification for the size of the recording medium based on the change request (step S309).

On the other hand, when the result of the determination by the determination unit 153 shows that the print image is not still smaller ("No" step S307), the notification controller 159 notifies the display unit 130 of the result of the determination (step S311).

The reception unit 151 then receives instruction information on whether or not to change the size of the recording medium with reference to the print image (step S313).

When the instruction information indicates an instruction to change the size of the recording medium with reference to the print image ("Yes" at step S315), the first display controller 155 then changes a magnification of the background image displayed in the display unit 130 by the inverse number of the magnification for the size of the recording medium based on the change request (step S317).

On the other hand, when the instruction information indicates no instruct to change the size of the recording medium with reference to the print image ("No" at step S315), the second display controller 157 changes a magnification of the print image displayed in the display unit 130 by the magnification for the size of the recording medium based on the change request (step S319).

FIG. 7 is a flowchart of an example of a display change processing for a background image to be executed in the display processing apparatus 100 according to the embodiment.

First, the reception unit 151 receives a designation of background information as a print target (preview target) from the operation unit 120 (step S401).

The first display controller 155 then reads out the specified background information from the background information storage unit 141 (step S403).

The first display controller 155 then changes a magnification of a background image included in the read background information by a scale of the print image displayed in the display unit 130 with respect to the size of the recording medium on which the print image is to be printed (step S405) and superimposes and displays the background image under the print image (step S407).

FIG. 8 is a flowchart of an example of a registration processing for background information to be executed in the display processing apparatus 100 according to the embodiment.

First, the reception unit 151 receives a notification of background information as a registration target from the operation unit 120 (step S501). The registration unit 161 registers the notified background information in the background information storage unit 141 (step S503).

As explained above, since a magnification of a print image is changed into a size of a recording medium on which the print image is to be printed, the size of the recording medium being changed by a scale of the background image displayed in the display unit, and the print image is superimposed and displayed on the background image, it is possible according to the embodiment to allow a user to check the size of a print material before printing.

According to the embodiment, it is therefore possible to prevent a situation where a print material is too small to have good readability of the print content, a situation where a print material is too large to have a look at the print content, and the like in printing the print material.

Besides, it is possible in the embodiment to deal with a change of the size of a recording medium by displaying a background image and a print image via a magnification change. Especially, since a change of the size of a recording medium is dealt with through not only a magnification change of a print image but also a magnification change of a background image, it is possible in the embodiment to deal with an extensive change in the size of a recording medium with a limited display size of the display unit.

Hardware Configuration

Figure 9:
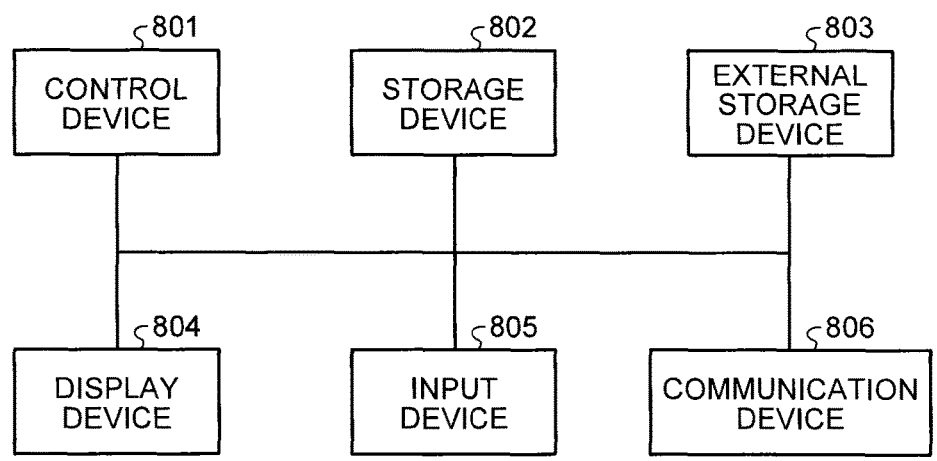
FIG. 9 is a block diagram of an example of a hardware configuration of the display processing apparatus according to the embodiment.

FIG. 9 is a block diagram of an example of a hardware configuration of the display processing apparatus 100 according to the embodiment. The display processing apparatus 100 according to the embodiment includes a control device 801 such as a CPU; a storage device 802 such as a ROM, a RAM, and a video RAM (VRAM); an external storage device 803 such as an HDD; a display device 804 such as a display; an input device 805 such as a keyboard and a mouse; and a communication device 806 such as a communication interface, and has a hardware configuration using a normal computer.

A program to be executed in the display processing apparatus 100 according to the embodiment is provided by being recorded in a file of an installable format or of an executable format in a computer-readable storage medium such as a CD-ROM, a CD-R, a memory card, a digital versatile disk (DVD), and a flexible disk (FD).

The program to be executed in the display processing apparatus 100 according to the embodiment may be provided by being stored on a computer connected to a network such as the Internet and downloaded via the network. Besides, the program to be executed in the display processing apparatus 100 according to the embodiment may be provided or distributed via a network such as the Internet. Moreover, the program to be executed in the display processing apparatus 100 according to the embodiment may be provided by being preloaded in a ROM and the like.

The program to be executed in the display processing apparatus 100 according to the embodiment has a module configuration that enables the above-described components to be realized on a computer. As an actual hardware, the CPU reads out from the HDD onto the RAM and executes the program, so that each component is realized on the computer.

According to an embodiment, there is an advantage of enabling a user to check a size of a print material before printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display processing apparatus comprising:
circuitry configured to:
scale dimensions of a background proportionally to dimensions of a display, display a first image of the background on the display according to the scaled dimensions of the background, scale dimensions of a recording medium to the scaled dimensions of the background, superimpose a second image of the recording medium on the first image of the background according to the scaled dimensions of the recording medium, the second image including a third image of an object that is to be printed on the recording medium, wherein the circuitry changes a magnification of the third image so that the third image has a scaled size of the object proportional to the scaled dimensions of the recording medium, and
provide a user of the display processing apparatus with a preview of a size of the object, which is to be printed on the recording medium, against the background.

2. The display processing apparatus according to claim 1, wherein the circuitry is further configured to:
receive a request for changing the size of the recording medium, and change a magnification of the third image of the object by using a magnification for the size of the recording medium based on the request.

3. The display processing apparatus according to claim 1, wherein the circuitry is further configured to:
receive a request for changing the size of the recording medium, and
change a magnification of the first image of the background by using an inverse number of a magnification for the size of the recording medium based on the request.

4. The display processing apparatus according to claim 1, wherein the circuitry is further configured to:
receive a request for changing the size of the recording medium,
store setting information indicating a first setting by which the size of the recording medium is changed with reference to the first image of the background displayed in the display or a second setting by which the size of the recording medium is changed with reference to the third image of the object displayed in the display,
change a magnification of the third image of the object by using a magnification for the size of the recording medium based on the request when the setting information indicates the first setting, and
change a magnification of the first image of the background by using an inverse number of a magnification for the size of the recording medium based on the request when the setting information indicates the second setting.

5. The display processing apparatus according to claim 4, wherein the circuitry is further configured to:
determine, when the setting information indicates the first setting, whether or not the third image of the object is still smaller than the first image of the background displayed in the display even after changing the magnification of the third image of the object by using the magnification for the size of the recording medium based on the request,
change the magnification of the third image of the object by using the magnification for the size of the recording medium based on the request when the third image of the object is still smaller than the first image of the background, and
change the magnification of the first image of the background by using the inverse number of the magnification for the size of the recording medium based on the request when the third image of the object is not still smaller than the first image of the background.

6. The display processing apparatus according to claim 5, wherein the circuitry is further configured to:
notify the display that the third image of the object is not still smaller than the first image of the background when the third image of the object is not still smaller than the first image of the background,
receive instruction information on whether or not to change the size of the recording medium with reference to the third image of the object,
change the magnification of the first image of the background by using the inverse number of the magnification for the sire of the recording medium based on the request when the third image of the object is not still smaller than the first image of the background and the instruction information indicates an instruction to change the sire of the recording medium with reference to the third image of the object, and change the magnification of the third image of the object by using the magnification for the size of the recording medium based on the request when the third image of the object is not still smaller than the first image of the background and the instruction information indicates no instruction to change the size of the recording medium with reference to the third image of the object.

7. The display processing apparatus according to claim 1, wherein the scale of the first image of the background corresponds to a scale of the first image of the background displayed in the display with respect to actual dimensions of a. background shown by the first image of the background.

8. The display processing apparatus according to claim 1, wherein the circuitry is further configured to:

change the magnification of the third image of the object so that the third image of the object has the size of the recording medium and superimposes and displays the third image of the object on the first image of the background, and change the magnification of the first image of the background by using actual dimensions of a background shown by the first image of the background and superimpose the third image of the object on the first image of the background.

9. A display processing apparatus comprising:
circuitry configured to:
scale dimensions of a background proportionally to dimensions of a display,
display a first image of the background on the display according to the scaled dimensions of the background,
display a second image of a recording medium on the display,
change a magnification of the second image of the recording medium on the display,
scale the dimensions of the background proportionally to dimensions of the changed magnification of the second image of the recording medium, superimpose the recording medium on the first image of the background according to the scaled dimensions of the background, wherein the circuitry changes a magnification of a third image of an object that is to be printed on the recording medium so that the third image has a scaled size of the object proportional to the changed magnification of the recording medium, and provide a user of the display processing apparatus with a preview of a size of the object, which is to be printed on the recording medium, against the background.

10. The display processing apparatus according to claim 9, wherein the circuitry is further configured to:
receive a request for changing the size of the recording medium, and
change a magnification of the third image of the object by using a magnification for the size of the recording medium based on the request.

11. The display processing apparatus according to claim 9, wherein the circuitry is further configured to:
receive a request for changing the size of the recording medium,
change a magnification of the first image of the background by using an inverse number of a magnification for the size of the recording medium based on the request.

12. The display processing apparatus according to claim 9, wherein the circuitry is further configured to:
receive a request for changing the size of the recording medium,
store setting information indicating a first setting by which the size of the recording medium is changed with reference to the first image of the background displayed in the display or a second setting by which the size of the recording medium is changed with reference to the third image of the object displayed in the display,
change a magnification of the third image of the object by using a magnification for the size of the recording medium based on the request when the setting information indicates the first setting, and
change a magnification of the first image of the background by using an inverse number of a magnification for the size of the recording medium based on the request when the setting information indicates the second setting.

13. The display processing apparatus according to claim 12, wherein the circuitry is further configured to:
determine, when the setting information indicates the first setting, whether or not the third image of the object is still smaller than the first image of the background displayed in the display even after changing the magnification of the third image of the object by using the magnification for the size of the recording medium based on the request,
change the magnification of the third image of the object by using the magnification for the size of the recording medium based on the request when the third image of the object is still smaller than the first image of the background, and
change the magnification of the first image of the background by using the inverse number of the magnification for the size of the recording medium based on the request when the third image of the object is not still smaller than the first image of the background.

14. The display processing apparatus according to claim 13, wherein the circuitry is further configured to:
notify the display that the third image of the object is not still smaller than the first image of the background when the third image of the object is not still smaller than the first image of the background,
receive instruction information on whether or not to change the size of the recording medium with reference to the third image of the object,
change the magnification of the first image of the background by using the inverse number of the magnification for the size of the recording medium based on the request when the third image of the object is not still smaller than the first image of the background and the instruction information indicates an instruction to change the size of the recording medium with reference to the third image of the object, and
change the magnification of the third image of the object by using the magnification for the size of the recording medium based on the request when the third image of the object is not still smaller than the first image of the background and the instruction information indicates no instruction to change the size of the recording medium with reference to the third image of the object.

15. The display processing apparatus according to claim 9, wherein the circuitry is further configured to:
change the magnification of the third image of the object so that the third image of the object has the size of the recording medium and superimposes and displays the third image of the object on the first image of the background, and change the magnification of the first image of the background by using actual dimensions of a background shown by the first image of the background and superimpose the third image of the object on the first image of the background.

16. A display processing method implemented by circuitry, the method comprising:

scaling dimensions of a background proportionally to dimensions of a display;

displaying a first image of the background on the display according to the scaled dimensions of the background;

scaling dimensions of a recording medium to the scaled dimensions of the background;

superimposing a second image of the recording medium on the first image of the background according to the scaled dimensions of the recording medium, the second image including a third image of an object that is to be printed on the recording medium, wherein the circuitry changes a magnification of the third image so that the third image has a scaled size of the object proportional to the scaled dimensions of the recording medium; and providing a user of the display processing apparatus with a preview of a size of the object, which is to be printed on the recording medium, against the background.

\* \* \* \* \*